United States Patent
Kusase et al.

[11] Patent Number: 6,166,461
[45] Date of Patent: *Dec. 26, 2000

[54] WINDING ARRANGEMENT OF ALTERNATOR FOR VEHICLE

[75] Inventors: Shin Kusase, Obu; Tsutomu Shiga, Nukata-gun, both of Japan

[73] Assignee: Denso Corporation, Kariya, Japan

[ * ] Notice: This patent is subject to a terminal disclaimer.

[21] Appl. No.: 09/333,028

[22] Filed: Jun. 15, 1999

Related U.S. Application Data

[62] Division of application No. 09/004,923, Jan. 9, 1998, Pat. No. 5,955,804, which is a continuation of application No. PCT/JP97/01840, May 28, 1997, and a continuation of application No. PCT/JP97/03789, Oct. 20, 1997.

[30] Foreign Application Priority Data

Mar. 10, 1997 [JP] Japan ..................... 9-054988

[51] Int. Cl.[7] ............... H02K 9/00; H02K 3/04
[52] U.S. Cl. .............. 310/58; 310/59; 310/60 R
[58] Field of Search .................. 310/52, 58, 59, 310/60 R, 179, 180, 208; 29/596, 597, 598

[56] References Cited

U.S. PATENT DOCUMENTS

| | | | |
|---|---|---|---|
| 1,751,424 | 3/1930 | Rosenthal | 310/59 |
| 4,418,295 | 11/1983 | Shiga | 310/59 |
| 4,908,541 | 3/1990 | Kawazoe | 310/270 |
| 5,266,858 | 11/1993 | Ohmi | 310/208 |
| 5,343,105 | 8/1994 | Sakabe et al. | 310/179 |
| 5,691,590 | 11/1997 | Kawai | 310/180 |
| 5,705,865 | 1/1998 | Ishida | 310/62 |
| 5,757,095 | 5/1998 | Ohmi | 310/58 |
| 5,955,804 | 9/1999 | Kusase et al. | 310/59 |

FOREIGN PATENT DOCUMENTS

| | | |
|---|---|---|
| 55-147941 | 11/1980 | Japan . |
| 57-132743 | 8/1982 | Japan . |
| 59-111482 | 7/1984 | Japan . |
| 1-027406 | 8/1989 | Japan . |
| 1-123452 | 8/1989 | Japan . |
| 23-73225 | 11/1991 | Japan . |
| 4-24939 | 4/1992 | Japan . |
| 6-46550 | 2/1994 | Japan . |
| 7-194060 | 7/1995 | Japan . |
| 2 196 189 | 8/1987 | United Kingdom . |

OTHER PUBLICATIONS

Patent Abstract of Japan, vol. 009, No. 010, Jan. 17, 1985, (1985–01–17), JP 59 159638 A (Nippon Denso KK), Sep. 10, 1984.

*Primary Examiner*—Nestor Ramirez
*Assistant Examiner*—Tran N Nguyen
*Attorney, Agent, or Firm*—Pillsbury Madison & Sutro LLP

[57] ABSTRACT

The coil-end portions of an armature winding are disposed around cooling fans and closely, and outer coil ends of the coil-end portions are disposed to be close to alternator frames via insulating layers. The coil ends are spaced apart from one another except the base portions, and the resistance of cooling air draft inside the coil-end portions is lower than that around the coil-end portions so that the cooling air mainly passes through the inside of the coil-end portions.

5 Claims, 8 Drawing Sheets

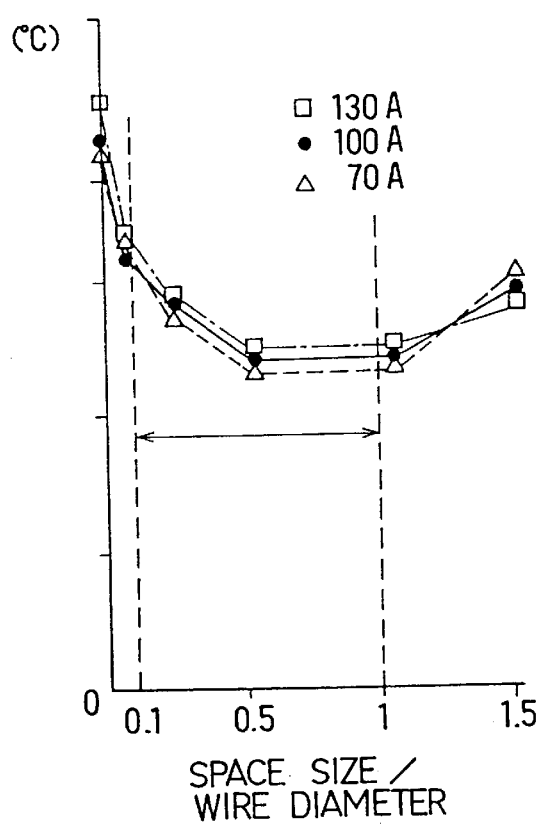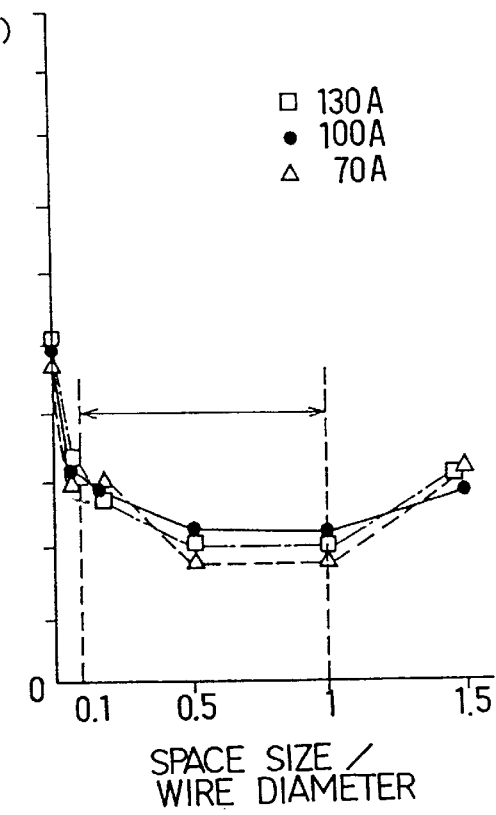

WINDING ARRANGEMENT OF ALTERNATOR FOR VEHICLE

CROSS REFERENCE TO RELATED APPLICATION

This is a division of application Ser. No. 09/004,923, filed Jan. 9, 1998 now U.S. Pat. No. 5,955,804 which is a continuation application of PCT/JP97/01840 filed on May 28, 1997 and PCT/JP97/03789 filed on Oct. 20, 1997 and based on and claims priority from Japanese Patent Application No. Hei 9-054988 filed on Mar. 10, 1997 and PCT/JP97/01840 filed on May 28, 1997, the contents of which are incorporated herein by reference.

BACKGROUND OF THE INVENTION

1. Field of the Invention

The present invention relates to a winding arrangement of an alternator for a vehicle which is mounted in a passenger car, a truck or the like.

2. Description of the Related Art

Various improvements have been proposed to make an alternator for a vehicle more compact and more powerful.

JP-A-6-46550 proposes using permanent magnets for increasing the output power of an alternator. However, in order to comply with the demand for reducing the size of the alternator, the size of the cooling fan must be reduced. This reduces an amount of the cooling air, while Joule heat and, in turn, temperature rise increases as the output power increases. In other words, in order to provide a compact and powerful alternator, it is important to control the temperature rise, in particular, the heat dissipation of the armature coil in a limited space.

In view of these circumferences, JP-A-7-194060 discloses a water cooling system for an alternator instead of the air cooling system to increase the cooling effect on the alternator. However, it is apparent that the water cooling system inevitably requires water pipes and a water jacket disposed in the alternator and, therefore, the size and weight thereof increase.

In a common air cooling system of the alternator, the coil-ends of an armature coil are mainly cooled, and various improvements thereof are proposed in the following publications: JP-B2-4-24939, JP-A-63-59744, JP-Y2-1-27406 and JP-A-57-132743.

Each of those system has the following problems although it has some cooling effect on the alternator.

In JP-B2-4-24939, a number of spaces are provided between respective phase-windings so that cooling air can pass therethrough. However, the cooling air blows only on a part of the winding as the parallel flow whose cooling effect is proportional to 0.6 th power of a wind velocity and is not sufficient as compared with the right-angled flow whose cooling effect is proportional to a square of the wind velocity. FIG. 3 of the publication shows a coil end having wires spaced apart from one another. Cooling air passes the spaces between the wires. Although such a structure provides some cooling effect, the amount of the cooling air is limited because a half of the coil end is closely covered by another coil end as shown in FIGS. 2 and 3 of the publication.

In JP-A-63-59744, the coil end has some spaces for reducing the resistance of a draft, and a cooling fan is provided to blow cooling air thereon in the radially outside direction to increase the cooling effect of the coil and other parts. However, this structure, in which a Lundell type rotor has an axially long field coil and thick pole-core-discs to provide sufficient magnetic field as shown in FIG. 1 of the publication, provides little benefits because the fan is positioned between the middle and the top of the coil end and does not cover the entire coil end. In other words, although the spaces for the cooling air in the limited portion of the coil ends which correspond to the fan allow the cooling air, to pass the cooling air does not cool all of the entire coil ends. Because drafting spaces are formed circumferentially at equal intervals to correspond to the winding pitch of the coil ends, the cooling air compressed by the fan blades is decompressed periodically at the drafting spaces, thereby making a siren sound or pitch noises.

In addition, the coil end units are shifted to provide spaces after the coil ends are aligned and flattened to have sufficient surfaces. As a result, the axial length of the coil end is increased.

JP-Y2-1-27406 shows spaces between coils of the same phase winding. However, it does not show spaces between coils of different phase windings JP-B2-4-24939 also does not show spaces between coils of different phase windings. For example, as shown in FIG. 4 of the publication, most portions of a coil end other than the section A—A is closely covered by another coil end of a different phase winding, thereby limiting the cooling effect.

Various attempts to dispose each element of a coil end have been made to improve the ventilation of the cooling air and the heat dissipation. Although each one of them has a structure which has spaces between coil elements of the same coil end and is aligned with another and flattened to provide a large cooling air passage, the passage is covered by another coil end thereby increasing the draft resistance. Moreover, only a limited portion near the fan is cooled and the fan noises increases considerably, causing problems in practical operation.

SUMMARY OF THE INVENTION

Therefore, the object of the present invention is to solve the above-stated problems.

Another object of the present invention is to provide an improved structure for introducing a cooling air inside the coil ends of the armature winding, thereby improving heat dissipation of the coil ends.

Another object of the present invention is to reduce noises caused by a cooling fan.

According to a feature of the invention, in the coil-end portions of the armature winding, the coil ends which compose the coil-end portions are spaced apart from one another like star clusters so that the cooling air can pass through the inside of the coil-end portions. The cooling air collides with each of the coil ends and zigzags therein so that whole surfaces of the respective coil ends can receive high speed cooling air, thereby increasing heat dissipation and the cooling effect.

Because the cooling air causes numerous reflection and absorption of sound waves repeatedly with a large number of coils and spaces being disposed therearound, noises can be reduced drastically. It is possible that a plurality of the coil ends of each of coil-end portions are bundled to form spaces among the bundles of the coil ends. Each of the bundles has two or three coil ends to have a sufficient number of spaces in order to provide sufficient surfaces exposed to the cooling air.

Preferably, a large number of coil ends are evenly distributed in one of the coil-end portions. However, they can be divided into a plurality of groups in either axial or radial section thereof. For example, comparatively small spaces are distributed in each of three phase-windings (X-phase-winding, Y-phase-winding, and Z-phase-winding) and the coil ends extend from base portions thereof (which are adjacent to the end surfaces of the stator core) at an angle from one another. Accordingly, the armature coil can be mounted easily.

According to another feature of the invention, the ratio of each size of the spaces in the coil-end portions to the wire diameter of the coil ends is fixed to provide a maximum heat dissipation. Preferably, the ratio is between 1 and $1/10$.

According to another feature of the invention, a plurality of the coil ends are bonded by an adhesive only at the base portions to close the spaces near the base portion. The base portions, which are subject to a maximum deformation moment, are reinforced by the adhesive, and other portions provide enough open spaces for the cooling air so that both vibration resistance and heat dissipation can be improved.

According to another feature of the invention, a plurality of coil ends of each of the coil-end portions are formed into layers so that the cooling air can pass between layers and reach deep in the coil-end portions. The layers can be disposed in parallel with the rotor axis, in the radial direction like the spokes of a wheel.

According to another feature of the invention, cooling air passages are formed between the layers to open at axial ends of the coil-end portions so that the cooling air can be introduced from the axial ends of the coil-end portions. The passages of the cooling air are disposed so that the cooling air can be supplied to the inside of the axially extending coil-end portions toward both inner and outer directions evenly, thereby providing even heat dissipation of the coil-end portions.

According to another feature of the invention, a cooling fan is disposed radially inside the coil-end portions, one ends of the coil-end portions are disposed radially inside the inner periphery of the stator core, and the coil-end portions are tapered to cover the cooling fan. Therefore, the coil ends can be spread wide.

According to another feature of the invention, the coil-end portions are disposed near the frame at a distance approximately equal to a size of the spaces. Therefore, the cooling air can pass the inside of the coil-end portions more easily than between the coil-end portions and the frame, thereby improving the heat dissipation.

According to another feature of the invention, the coil-end portions are in contact with the frame to increase the resistance of draft and cooling air passing through the inside of the coil-end portions, so that heat of the coil ends can be transferred to the frame, thereby lowering the temperature of the coil-end portions.

According to another feature of the invention, a flexible heat conductive insulating member is disposed between the coil-end portions and the frame to transfer the heat of the coil ends to the frame. In order to increase the resistance of draft around the coil-end portions, the base portions of the coil ends are provided with insulating films extending from the stator core to close the spaces between the coil ends and the stator core. Thus, the cooling air can be introduced into the inside of the coil end.

According to another feature of the invention, a centrifugal cooling fan is disposed radially inside the coil-end portions closely thereto, so that the coil-end portions can be cooled by the cooling air having maximum wind power. The coil-end portions according to the present invention can be located as near as 2% of the diameter of the cooling fan from the same.

According to another feature of the invention, the rotor has a Lundell type pole core which has claw pieces and U-shaped openings between the claw pole pieces, a cooling fan and a barrier member for closing the U-shaped openings for forming an auxiliary fan portion. Thus the quantity and speed of the cooling air flowing toward the coil-end portions can be increased. In addition, the U-shaped openings correspond to the fan blades of the cooling fan to generate the cooling air jointly.

According to another feature of the invention, the axial position of the barrier member corresponds to the base portions of an end of the stator core. Therefore, the cooling air can be supplied sufficiently by the cooling fan and the wall surfaces of the U-shaped openings.

According to another feature of the invention, the barrier member can be made of a non-magnetic member, a permanent magnet disposed to suppress leakage flux between the poles, or a member for holding the permanent magnet.

According to another feature of the invention, the cooling air is introduced from a direction radially outside the coil-end portions. Therefore, cooling air of a comparatively low temperature, which is not heated by any of high temperature members such as the rotor, can be supplied to the coil-end portions, thereby increasing the heat dissipation.

According to another feature of the invention, each of the coil-end portions of the armature winding is formed by dividing the coil ends extending from the same slot into two groups respectively directing opposite circumferential directions. Therefore, the number of the coil ends can be reduced.

According to another feature of the invention, the armature winding comprises double-layered wave-wound windings. Therefore, the wave-wound coils can be formed only by deforming flat bundles of coils to be inserted into the slots.

According to another feature of the invention, the armature winding comprises $2\pi/3$-short-pitch windings. Therefore, interference between the coil ends is eliminated and the spaces between the coil ends can be provided easily.

According to another feature of the invention, the armature winding can be provided with compact coil ends, and each of the layers can be shifted easily to pass sufficient cooling air between the layers easily.

BRIEF DESCRIPTION OF THE DRAWINGS

FIG. 4 is a graph showing a test result;

FIG. 5 is a graph showing a test result;

DETAILED DESCRIPTION OF THE PREFERRED EMBODIMENTS

Alternators according to an embodiment of the present invention is described hereafter. A basic structure of an alternator for a vehicle is described with reference to the appended drawings.

Figure 1:
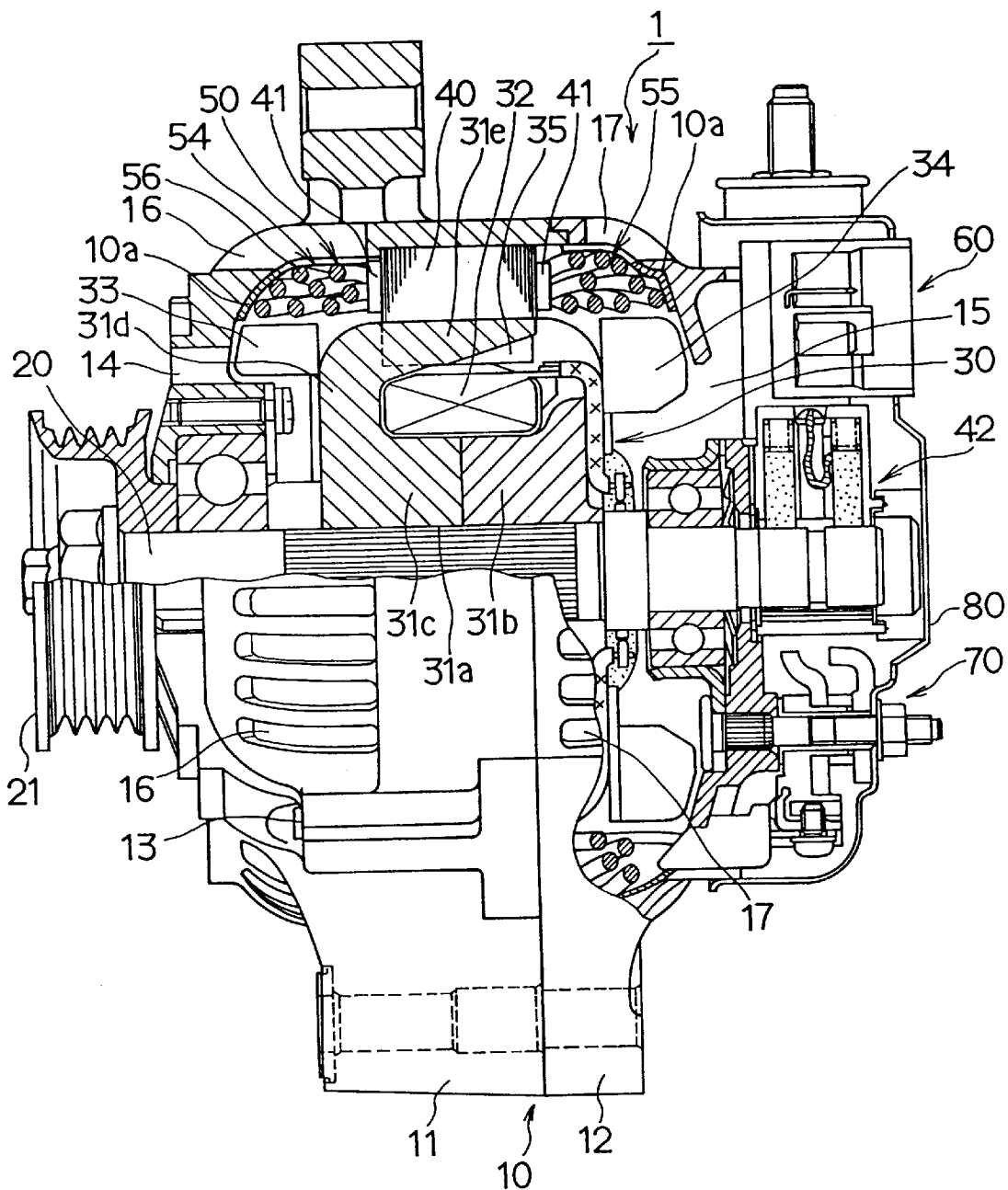
FIG. 1 is a longitudinal cross-sectional view illustrating an alternator according to an embodiment of the present invention.

In FIG. 1, an alternator 1 has a frame 10, which is composed of a front frame 11 and a rear frame 12. The two frames 11,12 are fastened by a plurality of bolts 13 each other. The frame 10 has inlet openings 14 and 15 of cooling air on the opposite ends thereof and, also, has a plurality of slit-like outlet openings 16 and 17 of the cooling air on the circumferential surfaces thereof around later-described cooling fans.

A rotary shaft 20 is rotatably supported by the frame 10. A pulley 21 is fixed to an end of the rotary shaft 20 to receive engine torque. A rotor 30 is carried by the shaft 20 at the middle thereof. A current collector 42 composed of slip rings and brushes is disposed at a rear portion of the shaft 20 to supply field current to a field coil 32.

The rotor 30 has a Lundell type pole core 31 and the field coil 32 disposed in the pole core 31. The pole core 31 is composed of a pair of claw poles 31a and 31b. Each of the claw poles 31a and 31b has a boss portion 31c fitted to the shaft 20 and a disc portion extending radially outside from the boss portion 31c and a plurality of claw pieces 31e.

Cooling fans 33 and 34 are fixed to the opposite ends of the rotor 30. The front cooling fan 33 has fan blades for a centrifugal fan and fan blades for a mixed flow fan. Each of the fan blades for a mixed flow fan is disposed on a surface of the disc 31d along a side of U-shaped openings formed between the adjacent claw pieces. The rear cooling fan 34 has centrifugal fan blades.

Figure 13:
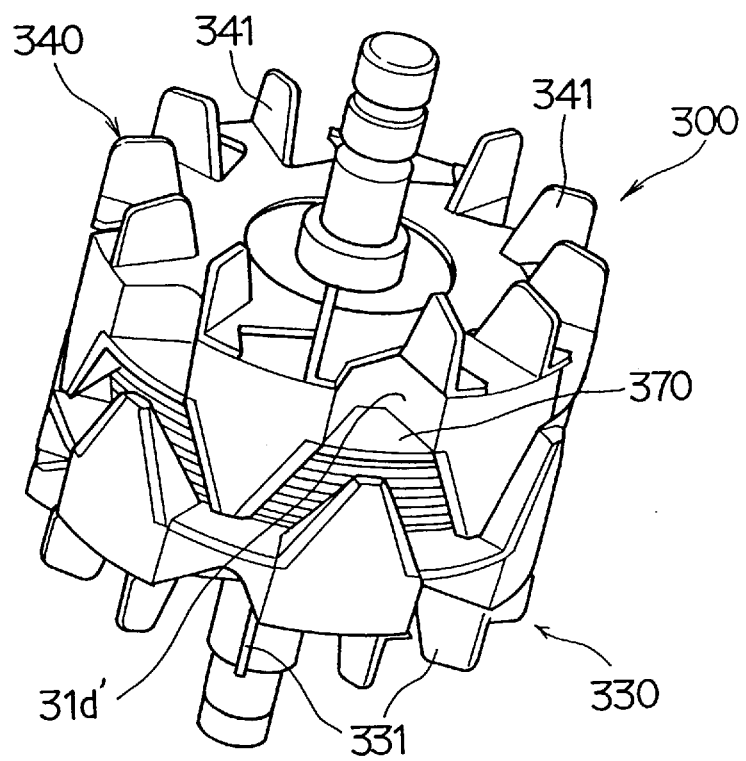
FIG. 13 is a perspective view illustrating a rotor according to another embodiment of the present invention.

The rotor 30 has an auxiliary magnet unit 35, which is disposed between the claw pieces 31e, for increasing the effective magnetic flux for the armature winding. The auxiliary magnet unit 35 is composed of a plurality of permanent magnets each of which is disposed between a pair of claw pieces and a magnet holder, which preliminarily holds all the permanent magnets. The magnet holder is made of non-magnetic resinous material and has boxes for holding the permanent magnets, each of which is disposed between two of the claw pieces. The auxiliary magnet unit 35 is disposed so that the axial ends thereof correspond to the axial ends of the stator core 40. The axial ends of the auxiliary magnet unit 35 functions as a partial barrier of cooling air flowing between the claw pieces 31e. Accordingly, the wall surfaces (e.g. 31d in FIG. 13) of the U-shaped opening functions as a fan generating radial air flow. Incidentally, the permanent magnets may be exposed from the magnet holder.

The stator core 40 is disposed around the rotor 30 and fixed to the frame 10. The stator core 40 is composed of cylindrical laminated steel sheets and has a plurality of slots on the inner periphery thereof.

An armature winding 50 composed of an insulated magnet wires is wound on the stator core 40. The armature winding 50 has straight portions disposed in the slots and curved coil-end portions 54 and 55 extending axially from the stator core 40.

An armature winding 50 is a three-phase winding composed of an X-phase-winding, a Y-phase-winding and a Z-phase-winding. The coil-end portions 54 and 55 are composed of a plurality of coil ends 56 crossing over the slots.

Portions of the coil ends 56 on the outside of the coil-end portions 54 and 55 are in contact with inner peripheries of the frames 11 and 12 via heat conductive insulating layers 10a. The insulating layers 10a are formed on the entire inside surface of the frame. However, it can be formed partly on the portions facing the coil ends 56. In order to paste the coil ends 56 to the layer, they are brought into contact with the layer before it dries. An adhesive can be applied to the coil ends after they are in contact with the layer instead. A heat conductive insulating film or mold can be used instead of the layer.

A voltage regulator 60 and a rectifier 70 are mounted on the outer surface of the rear frame 12 and covered by a cover plate 80.

The operation of the alternator 1 is described next. When the rotor 30 is driven by an engine, field current is supplied from the voltage regulator 60 through the current collector 42 to the field coil 32, and a rotating field is formed so that ac power is generated in the armature winding 50. The ac power is rectified by the rectifier 70 and supplied to vehicle loads.

When the rotor 30 rotates, the cooling fans 33 and 34 also rotate to suck cooling air from opposite ends of the rotor and discharge radially outside. The cooling air taken in by the front cooling fan from the inlet opening 14 is divided into an air flow toward the coil-end portions 54 and an air flow along passages between the claw pieces 31e to cool the rotor 30. A part of the air flow is directed radially outward by the wall surfaces (e.g. 31d' in FIG. 13) of the U-shaped opening to the coil-end portions 54.

The cooling air taken in by the rear cooling fan from a plurality of inlet openings of the cover 80 cools the voltage regulator 60, the rectifier 70 and current collector 42, and is introduced through the inlet opening 15 and directed to the coil-end portions 55. The cooling air flowing between the claw pieces is directed radially outward to the coil-end portions 55 by the wall surfaces of the U-shaped openings of the rear claw pole 31b. It is noted that the coil-end portions 54 and 55 are cooled by cooling air just before they are discharged.

The structure and operation of the coil-end portions 54 and 55 are described in more detail hereafter.

The coil-end portions 54 and 55 are disposed in the air flow passages directed to the outlet openings 16 and 17. Each of the coil-end portions 54 and 55 is composed of a plurality of coil ends 56 arranged to distribute evenly to form spaces therebetween, each of which is as wide as the diameter of the wire of the coil ends.

Figure 2:
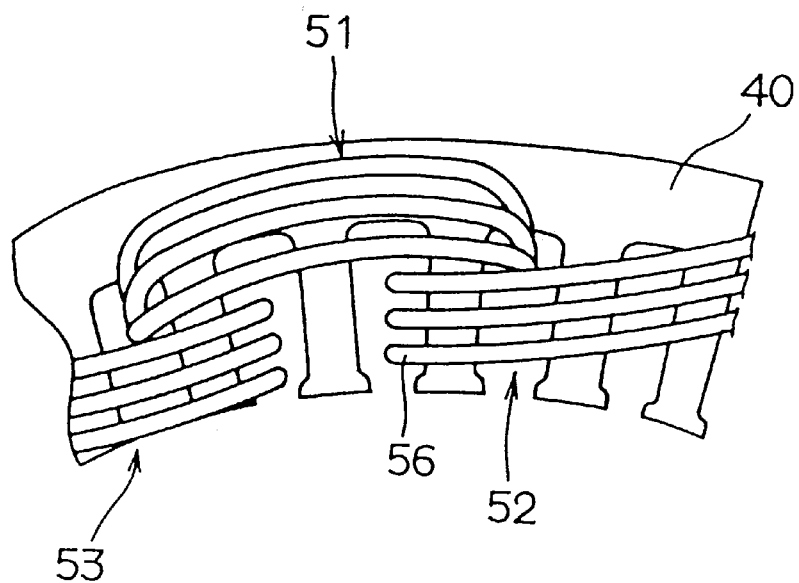
FIG. 2 is a plan view illustrating a coil-end portion of an armature winding on a stator.
Figure 3:
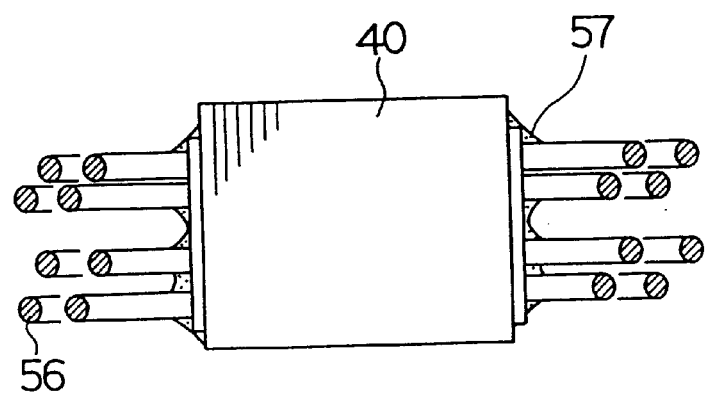
FIG. 3 is a cross-sectional view illustrating a portion of the stator having the coil end portion.

As shown in FIGS. 2 and 3, the coil ends 56 are bundled and bonded by an adhesive 57 at a base portion near the slot. The spaces between the coil ends 56 other than the base portions are not closed by the adhesive. In other words, each of the coil ends 56, which form each of coils 51, 52 and 53, has the spaces without the adhesive except the base portion thereof. Such spaces are formed so that each one of the coil ends 56 of one phase-winding is spaced apart from another of the same phase-winding and also from another of a different phase-winding.

Figure 6:
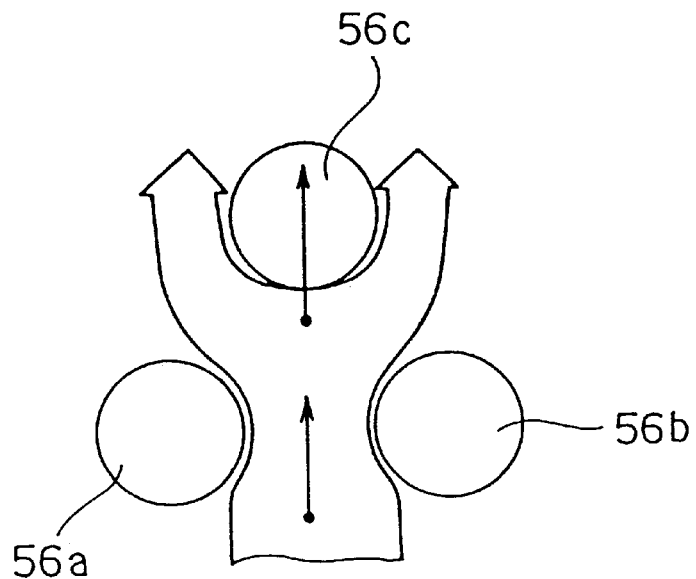
FIG. 6 is a schematic view illustrating the flow of cooling air between coil ends of the coil-end portion.

The coil ends 56 of the same phase-winding is divided into a plurality of layers as shown in FIG. 3. Each one of the coil ends 56 in an outside layer is disposed between adjacent two of the coil ends of an inside layer as shown in FIG. 6.

In other words, one of the coil ends 56 of one of a plurality of the layers is disposed between two adjacent coil ends of another layer disposed inside thereof. Thus, each of the coil ends of one layer is disposed between two adjacent coils of another layer disposed radially inside of the former layer. The above relationship is applied to the coil ends of other coil layers.

Although the coil ends 56 are not bonded with one another except the base portion, the vibration resistance thereof is assured by bonding of the base portions and by the portions of the frame in contact with the outside surface of the coil-end portions 54 and 55.

The straight portions of the armature winding 50 inserted in the slots are covered by insulating films 41 to insulate the armature winding 50 from the stator core 40. The insulating films 41 extend axially outward from the opposite ends of the stator core 40 to cover the base portions of the coil ends, thereby providing the draft resistance.

Thus, the draft resistance of the air passages around the coil ends portions 54 and 55 is increased by disposing the coil-end portions very closely to the inner surfaces of the frames 11 and 12, and the draft resistance of the base portions of the coil ends 56 is also increased by the insulating film 41. On the other hand, the coil-end portions 54 and 55 have a plurality of coil ends 56 spaced apart from one another to provide a plurality of air passages, thereby reducing the draft resistance of the cooling air passing through the inside thereof.

Therefore, the draft resistance of the passages in the coil-end portions is smaller than the draft resistance of the passage around the coil-end portions, and most of the cooling air driven by the cooling fans 33 and 34 passes through the inside of the coil-end portions 54 and 55. As a result, the coil-end portions 54 and 55 are cooled very efficiently.

Test results of the heat dissipation of the coil ends are shown by graphs in FIGS. 4 and 5. The rated classes of the alternator used in the tests are, respectively, 70 A (ampere), 100 A and 130 A. FIG. 4 shows relationship between the ratios of mean values of the spaces between the adjacent layers to the wire diameter and the temperatures of the coil-end portion. The spaces of the coil ends between two of the phase-windings are measured at portions except the base portions.

FIG. 5 shows relationship between the ratios of the mean values of the spaces of the coil ends in the same phase-winding to the wire diameter and temperature of the coil-end portions. The spaces of the coil ends are measured at portions except the base portions.

FIGS. 4 and 5 show that if the ratio of the space to the diameter is 0.1 or larger, the temperature of the armature winding can be maintained at a lowest level (150° C. in FIG. 4, 120° C. in FIG. 5) irrespective of the alternator capacity. On the other hand, even if the ratio becomes about 1.0, the temperature of the armature winding does not change much. If the ratio becomes a value between 1.0 and 1.5, the temperature rises. If the ratio becomes larger than 1, the size of the coil-end portions 54 and 55 increases. Therefore, the preferable range of the ratio is approximately between 0.1 and 1.0. In view of the temperature of the armature winding, the ratio being 0.5 or larger is desirable.

FIG. 6 is an enlarged sectional view illustrating three coil ends 56a–56c of the coil-end portions 54. The cooling air driven by the cooling fan 33 flows between the coil ends as indicated by thick arrows in FIG. 6. The cooling air blows on the upstream sides of coil ends 56a and 56b, which are disposed on the outside surface of the coil-end portions, and also on down stream sides thereof because the coil end 56c is disposed at a downstream side of the air flow passage. The coil end 56c is disposed at the downstream side of the coil ends 56a and 56b to face the space therebetween, thereby receiving the cooling air directly, which branches into an air flow passing through the space between the coil ends 56a and 56c and an air flow passing through the space between the coil ends 56b and 56c along the side and back surfaces of the coil end 56c. The arrows in FIG. 6 represent the magnitude of the wind power, and the wind power exerted on the coil end 56c does not decrease but rather increase after contraction of the air flow between the coil ends 56a and 56b.

Thus, effective cooling air flowing along the coil ends can be provided by setting proper spaces between the coil ends. If the spaces are too small, an amount of the cooling air decreases and the heat dissipation decreases. On the other hand, if the spaces are too large, the cooling air does not blow on the surfaces of the coil ends properly. Therefore, boundary breakaway layers of the cooling air are formed to lower the heat dissipation.

The cooling fans 33 and 34 are disposed close to the inside surfaces of the coil-end portions 54 and 55, which are disposed at a position where the face of the air blown by the cooling fans 33 and 34 is strongest. Therefore, the cooling fans 33 and 34 blows high speed air into the inside of the coil-end portions 54 and 55 in addition to the air driven by the difference in the resistance of the draft between portions around and inside the coil-end portions 54 and 55, thereby dissipating the heat effectively. Since the coil-end portions have numerous spaces, the pitch noises due to the reflected waves caused by collision of the wind can be minimized, and the pressure wave can be lowered by the sufficiently low draft resistance, thereby reducing the siren sound. As a result, the coil-end portions can be disposed near the cooling fan as closely as 2% of the diameter of the cooling fan without increasing the noises.

Temperature rise (due to Joule heat) of an alternator having the auxiliary magnet unit can be suppressed so that a resinous insulating material having low temperature resistance can be used. The auxiliary magnet unit increases the magnetic flux, so that the number of turns of the armature coil 50 can be reduced and the coil-end portions 54 and 55 can provide the spaces easily, thereby providing a compact, powerful and highly efficient alternator.

Each of the coil-end portions has a plurality of evenly-distributed coil ends forming a cluster in the passages of the cooling air.

Figure 7:
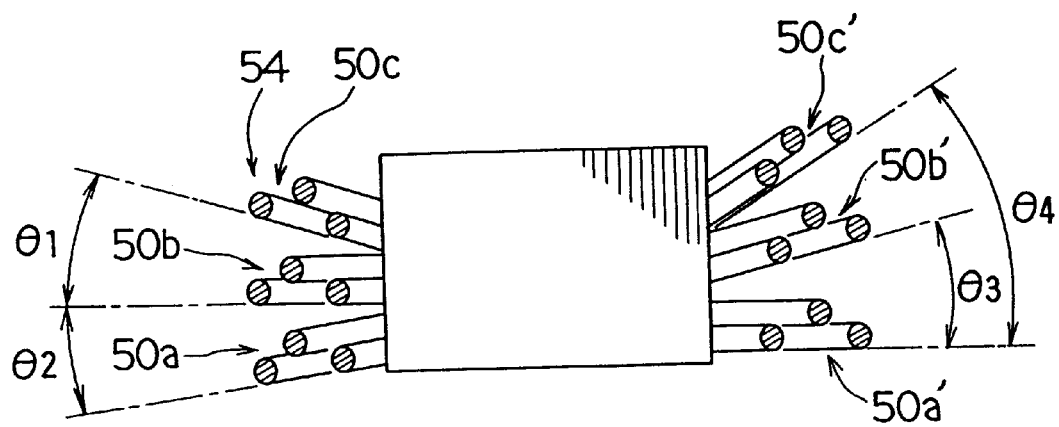
FIG. 7 is a cross-sectional fragmental view illustrating a coil-end portion according to another embodiment of the present invention.

In FIG. 7, clusters of the coil ends 50a, 50b, 50c, 50a', 50b' and 50c' are disposed to have comparatively small spaces so that they are inclined by an angle between θ1–θ4 to the axial direction to extend toward the center of the alternator. Between the clusters, there are wedge-shaped spaces. The coil end 56 is not in contact with the frame 11. There is a much smaller space between the coil end 56 and the frame 11 than the mean value of the spaces between the coil ends.

The clusters of the coil ends 50a and 50b are inclined to the direction of the air blown from the cooling fan 33 to introduce the cooling air to the rear end. The clusters of the rear coil ends are inclined to the opposite direction to introduce the cooling air to the front end.

Figure 8:
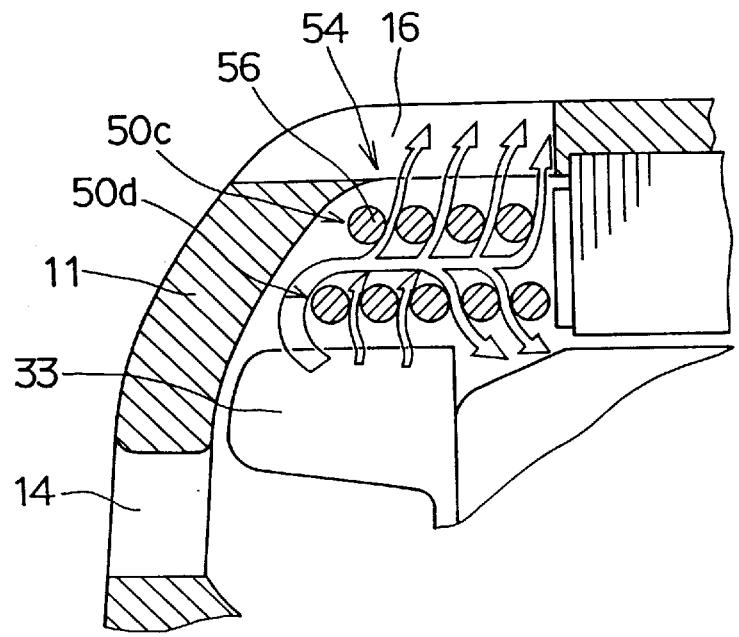
FIG. 8 is a cross-sectional fragmental view illustrating a coil-end portion according to another embodiment of the present invention.

As shown in FIG. 8, the clusters of the coil ends 50c, 50d can be formed in line with the axial direction. For instance, the clusters of the coil ends 50c and 50d are formed in each of the X, Y and Z-phase-windings and are put on top of one another. There are comparatively large spaces open to the axial end of the coil-end portions 54 between the clusters of the coil ends 50c and 50d. The space between the outer cluster of the coil ends 50c and the frame 11 is smaller than the mean value of the spaces between the coil ends. The cooling air driven by the cooling fan 33 flows from the axial end of the coil-end portion 54 as indicated by arrows in FIG. 8 and passes through the spaces between the clusters of the coil ends. As will be appreciated by those skilled in the art, FIG. 8 illustrates that the clusters are radially spaced apart from one another more than coil ends of each of the clusters are spaced apart.

Figure 9:
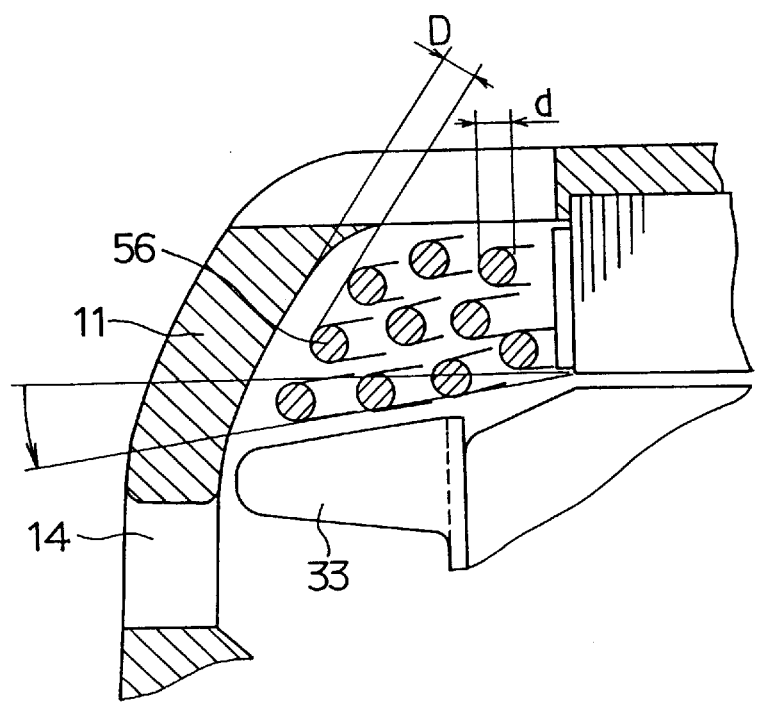
FIG. 9 is a cross-sectional fragmental view illustrating a coil-end portion according to another embodiment of the present invention.

The coil-end portions can be tapered to cover the cooling fan as shown in FIG. 9. That is, the coil ends are inclined at an angle θ so that the inside surface of the coil-end portions 54 is in parallel with the outer periphery of the cooling fan 33. Accordingly, a wider space can be provided for the coil-end portions 54. The distance D between the coil ends 56 disposed on the outermost layer of the coil-end portions 54 and the frame 11 is about the same as the wire diameter d. Thus, sufficient spaces can be provided between the coil ends, thereby introducing the cooling air between the outside surface of the coil-end portions and the frame. The coil-end portions shown in FIG. 9 can be formed to be in contact with the frame when they are mounted inside the frame to increase the contact surface thereof with the frame, thereby increasing the heat transmission. In addition, all the coil-end portions can be exposed to strong force of the blowing cooling air so that the cooling fan can be used effectively.

Figure 10:
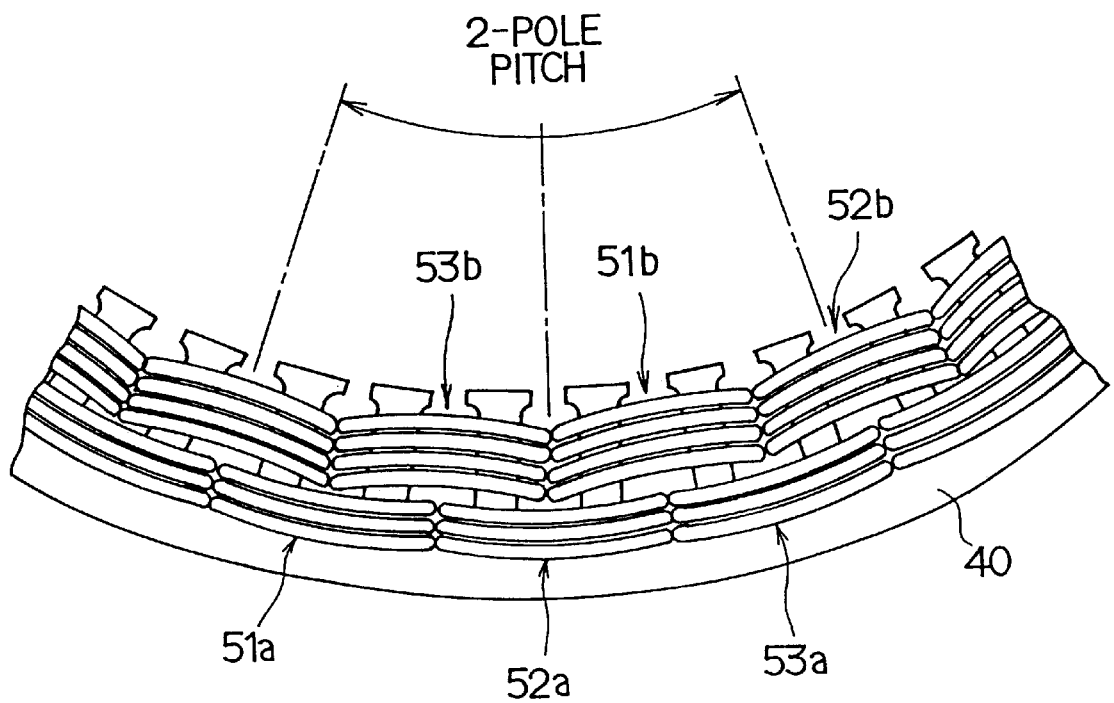
FIG. 10 is a plan view illustrating coil-end portions according to another embodiment of the present invention.
Figure 11:
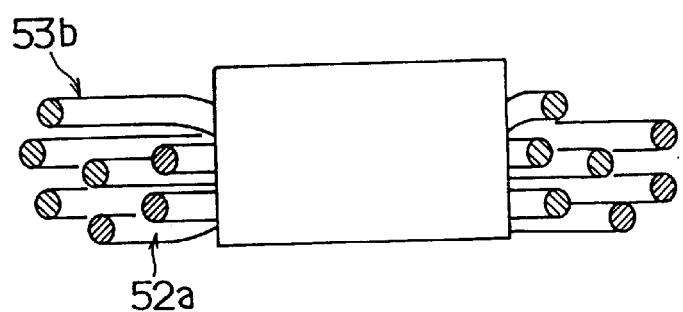
FIG. 11 is a cross-sectional view of a part of the coil-end portions illustrated in FIG. 10.
Figure 12:
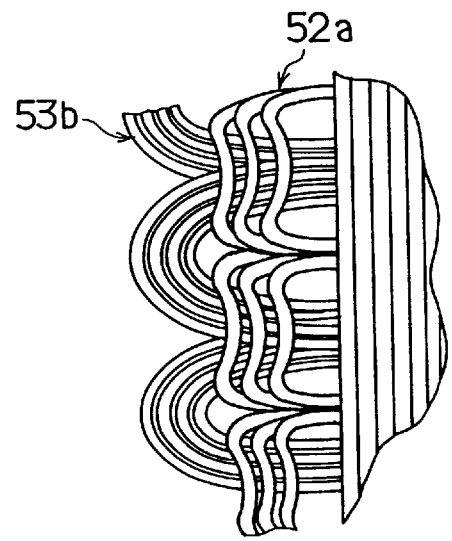
FIG. 12 is a plan view of a part of the coil-end portion illustrated in FIG. 10.

The single-layer wave-wound coils shown in FIG. 2 can be changed to double-layer wave-wound coils. The double-layer wave-wound coils provide not only the coil ends of each of the phase-winding but also the coil ends of two-layered clusters of the coil ends, thereby providing many spaces in the coil-end portions by comparatively simple manufacturing process. Such double-wound coils are disclosed in JP-B2-3-73225 and in FIGS. 10, 11 and 12, where double-layer 2π/3-short-pitch wave-wound coils are disclosed. In the double-layer 2π/3-short-pitch wave-wound coils, the coil ends thereof extend from the same slot to opposite directions. Therefore, the spaces between the coil ends can be provided easily. As shown in FIG. 10, one coil of each of the three phase-windings is disposed in every two-pole pitch. In addition, one of the coils 51a, 52a and 53a of a first layer and corresponding one of the coils 51b, 52b and 53 of a second layer are shifted by an electric angle of 60° C. from one another. As will be appreciated by those skilled in the art, FIG. 12 shows that the coil ends of the radially outer cluster are more spaced apart from one another than the coil ends of the radially inner cluster.

As shown in FIG. 1, the auxiliary magnet unit 35 functions a barrier of the cooling air flow and the side walls of the U-shaped openings between the claw pieces of the pole core drive the cooling air radially outward. However, it is possible to have a barrier member 370 on the rotor 300 shown in FIG. 13 instead of the above-described portions. It is also possible to provide fan blades 331 and 341 of the cooling fans 330 extending from the wall surfaces of the U-shaped openings to increase the fan capacity.

Figure 14:
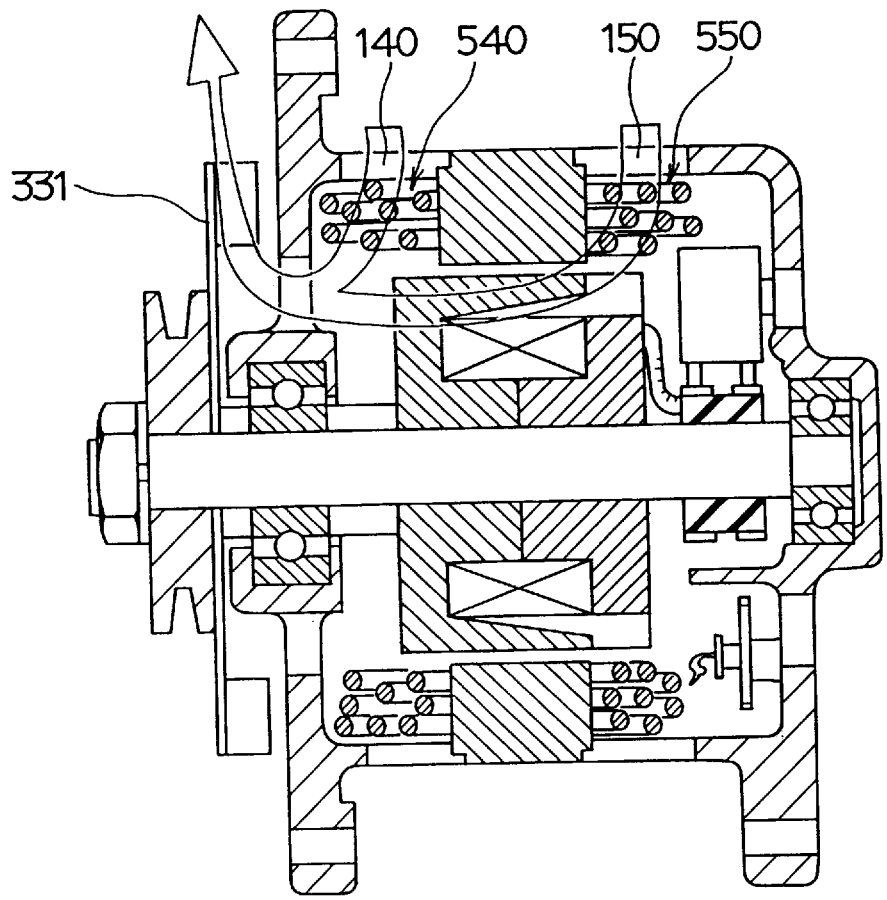
FIG. 14 is a cross-sectional view of an alternator according to another embodiment of the present invention.

The present invention can be applied to an alternator having an outside cooling fan as shown in FIG. 14. The cooling fan 331 disposed on the front side thereof takes the cooling air from inlet openings 140 and 150, which are formed on the outer periphery of the alternator, into the inside of the alternator and discharges it from the alternator. Therefore, coil-end portions 540 and 550 can receive fresh cooling air directly from the outside and can be cooled effectively. It is important that a plurality of coil ends are evenly distributed in the passages of the cooling air, and that the resistance of draft inside the coil-end portions is lower than the that around the coil-end portions.

Figure 15:
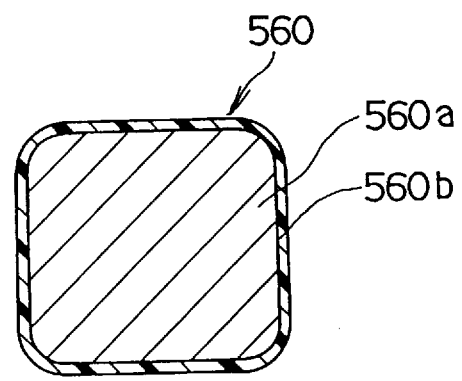
FIG. 15 is a cross-sectional view illustrating a magnet wire forming the armature winding according to another embodiment of the present invention.

Wires having some other shape such as polygonal wire can be used instead of the round wires for the armature winding 50. For instance, a chamfered square wire 560, which is composed of copper wire 560a and resinous insulating layer 560b as shown in FIG. 15, is preferable due to its abrasion resistance, workability and heat dissipation. In order to improve the abrasion resistance and the heat dissipation, the thickness of the insulating layer is reduced to 80%–40% of the thickness of the second class insulating layer, which is as thick as $400\mu$–$200\mu$, for example. Such wires can be obtained as the name of "super work-resistive coating magnet wire" of Furukawa Denko Inc. or "Wear Resistant Thin Layer Magnet Wire" of Sumitomo Denko Inc.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An alternator for a vehicle including:
   a pulley,
   a frame having a plurality of cooling air openings opening in radial directions,
   a stator core having a plurality of slots,
   a rotor disposed inside said stator core to be driven by said pulley,
   a cooling fan fixed to an axial end of said rotor, and
   an armature winding having straight portions disposed in said plurality of slots and coil end portions extending from said plurality of slots in cooling passages between said cooling fan and said cooling air openings to have strongest air blown by said cooling fan, wherein
   said armature winding has a plurality of phase-windings each of which has a plurality of axially extending clusters of coil ends radially spaced apart from one another to form spaces open to an axial end of said coil-end portions, and
   said coil ends of each of said clusters are axially spaced apart from one another.

2. An alternator as claimed in claim 1, wherein
   said clusters are radially spaced apart from one another more than said coil ends of each of said clusters are axially spaced apart.

3. An alternator as claimed in claim 1, wherein
   said coil ends of a radially outer cluster are more spaced apart from one another than said coil ends of a radially inner cluster.

4. An alternator as claimed in claim 2, wherein
   said clusters are disposed at an end of said stator core near said pulley.

5. An alternator as claimed in claim 1, wherein
   a space between radially outer one of said clusters and said frame is smaller than a mean value of spaces between said coil ends of said one of clusters.

* * * * *